United States Patent [19]

Kawada et al.

[11] 4,080,711

[45] Mar. 28, 1978

[54] METHOD AND APPARATUS FOR ROLL PACKING A FILM STRIP

[75] Inventors: Ken Kawada; Shigemitsu Mizutani, both of Minami-ashigara, Japan

[73] Assignee: Fuji Photo Film Co., Ltd., Minami-ashigara, Japan

[21] Appl. No.: 780,157

[22] Filed: Mar. 22, 1977

[30] Foreign Application Priority Data

Mar. 24, 1976 Japan .................................. 51-32347

[51] Int. Cl.[2] ........................ B65B 25/00; B65B 43/00; B23P 19/04

[52] U.S. Cl. ........................................ 29/427; 29/430; 53/118

[58] Field of Search .......................... 29/427, 430, 429; 53/118, 112 R; 242/55.16

[56] References Cited

U.S. PATENT DOCUMENTS

| | | | |
|---|---|---|---|
| 2,940,232 | 6/1960 | Wallace et al. | 53/112 R |
| 3,518,746 | 7/1970 | Hoover | 29/430 |
| 3,742,586 | 7/1973 | Butler | 29/430 |

*Primary Examiner*—Milton S. Mehr

*Attorney, Agent, or Firm*—Sughrue, Rothwell, Mion, Zinn and Macpeak

[57] ABSTRACT

A preassembled film cartridge is magnetically gripped by an arm and pivotally delivered between chucks which are moved towards each other to grip the ends of the cartridge spool. A stand mounting chucks is then moved under the cartridge, and the chucks pinch the slotted shell thereof to release the end cap, whereafter the stand is withdrawn to expose the gripped spool. The end of a precut film strip is then inserted in the aligned spool slot, and the spool is rotated to wind the film thereon. The stand is then moved back under the spool, carrying with it the shell and end cap, whereafter a capper engages the end cap and completes the cartridge reassembly. The chucks release the shell, the stand is again withdrawn, an arm magnetically engages the loaded cartridge, and the chucks release the spool, whereafter the cartridge is pivotally removed from the apparatus by the arm.

9 Claims, 6 Drawing Figures

METHOD AND APPARATUS FOR ROLL PACKING A FILM STRIP

BACKGROUND OF THE INVENTION

This invention relates to a method and apparatus for roll packing photographic film, and more particularly to a method and apparatus for automatically roll loading a strip of 35 mm film into a cylindrical film case or "patrone."

Rolls of 35 mm camera film are typically packed by winding a strip of precut film on the spool of a patrone P, as shown in FIG. 6, and a technique for automatically winding a film on a patrone in this manner is disclosed in U.S. Pat. No. 2,940,232.

In this conventional technique the following steps are performed at a plurality of work stations arranged in the form of a turret: a spool or winding core is supplied to a spool holding means, the end portion of a precut film is adhered to the core of the spool with a tape, a patrone or cylindrical shell is supplied and the wound spool is held in such a manner that it can be readily inserted into the patrone, the spool is then inserted into the patrone, and patrone caps are supplied and fitted over the ends of the patrone.

In this machine, before the film is wound in the patrone the component parts such as the spool, the film, the patrone, and the end caps are supplied at the different stations, and these elements are then assembled one at each station to complete the patrone. Therefore, it takes a considerably long period of time to complete the necessary assembling and packing operations. Furthermore, in the conventional machine a variety of component parts are independently supplied, and therefore the overall size and space requirements of the machine are relatively large. In addition, all of the assembling and packing operations must be carried out in a darkroom to avoid exposing the photosensitive film materials, and in assembling the component parts very accurate position detection and alignment sensors must be employed which increases the cost and complexity of the machine. Further if malfunctions occur in the machine all of the steps or processes must be suspended, whereby the overall efficiency of the machine is greatly reduced.

SUMMARY OF THE INVENTION

Accordingly, an object of this invention is to provide a method and apparatus for automatic film packing in which all of the drawbacks accompanying the above-described conventional technique are eliminated, and wherein a loaded film patrone is produced in a dark room by fewer steps than before.

These objects are achieved by disassembling a preassembled patrone by axially separating the spool and one end cap thereof from the other end cap and outer shell, engaging the end of a precut film strip with the spool shaft, winding the film to a predetermined length, and then reassembling the component parts.

In the prior art the spool, the outer shell, and the end caps are sequentially assembled in a darkroom. In this invention, on the other hand, the patrone is assembled in an ordinary, lighted room, and is then supplied to a darkroom where the film winding operation is effected. The work performed in the darkroom is therefore considerably simplified as compared with the prior art, and the initial assembly of the patrone in a lighted room leads to more positive and efficient work results.

The preassembled patrone is partially disassembled during the film winding process in the darkroom. The spool, the outer shell, and the end caps are always held on one and the same axis, however, whereby reassembly can be smoothly and readily achieved after the film has been wound on the spool. Further, since the component parts supplied to the apparatus involve only the film strips and the assembled patrones, the space occupied by the supply system is relatively small.

DETAILED DESCRIPTION OF THE PREFERRED EMBODIMENT

Figure 1:
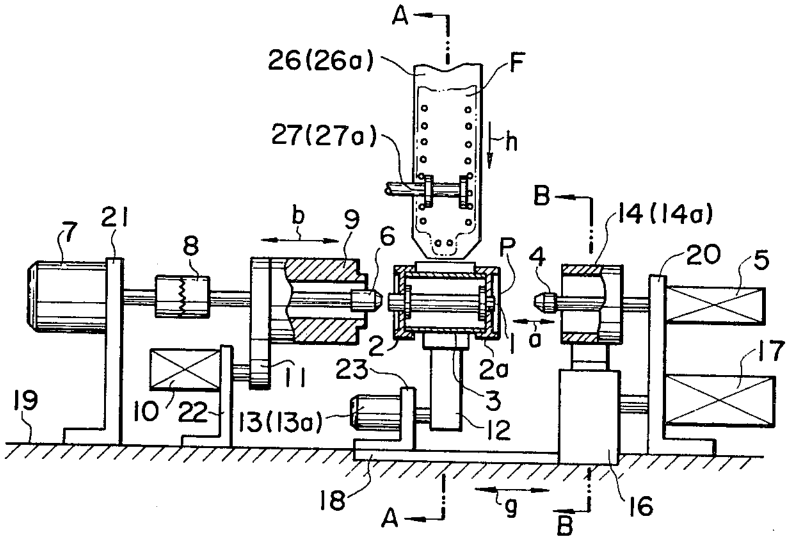
FIG. 1 shows a schematic diagram, partly in section, of a film winding apparatus according to this invention.

In FIG. 1, reference character P designates a patrone obtained by assembling a spool 1, end caps 2 and 2*a*, and an outer shell 3. A film F is to be wound in the patrone, and is formed to have a predetermined length and configuration.

Reference numeral 4 designates a chuck for engaging one end of the spool 1, 5 is an air cylinder which is reciprocated in the direction of the spool shaft as shown by the arrow (*a*), and 6 is a chuck for engaging the other end of the spool. A reversible electric motor 7 is adapted to drive the chuck 6 through a clutch 8. A capper 9 is provided for fitting a disassembled cap 2 back onto the shell 3 again, and reference numeral 10 designates an air cylinder adapted to reciprocate the capper 9 in the direction of the spool shaft as shown by the arrow (*b*). Magnetic arms 12 and 12*a* are for loading a patrone P into the apparatus and for unloading it from the apparatus, respectively. Reference numerals 13 and 13*a* designate rotary solenoids for turning the arms 12 and 12*a*, respectively, as indicated by the arrows (*c*) and (*d*), 14 and 14*a* are chucks adapted to engage the sides of the shell 3, and 15 and 15*a* are air cylinders for radially reciprocating the chucks 14 and 14*a* with respect to the assembled patrone P as indicated by the arrows (*e*) and (*f*), respectively, although both air cylinders are not always required if one of the chucks 14 or 14*a* is fixed.

Reference numeral 16 designates a stand for the chucks 14 and 14*a*, 17 is an air cylinder for reciprocating the stand 16 in the direction of the arrow (*g*) (same as (*a*)), 18 is a groove in a base plate 19 for guiding the stand 16, and 20 through 25 are mounting brackets for the various elements, such as the air cylinders and motors.

Reference numerals 26 and 26*a* designate a pair of guide plates for introducing the film F to a port 3*p* of the patrone P, and 27 and 27*a* are a pair of drive rollers for moving the film along the guide plates 26 and 26*a*. The guide plates are movable in the direction of the arrow (*h*), or in the radial direction of the spool 1, by a shifting mechanism (not shown).

The operation of the apparatus will now be described with reference to the various processes performed thereby.

(I) Supply of Patrones

The patrones are assembled in a normally illuminated room in advance, and are individually supplied to the pivotable arm 12 through a hopper (not shown). In this operation the patrone is supplied in such a manner that the port 3p thereof is oriented in a predetermined direction in order that when the patrone is moved to the position indicated by the solid lines in FIG. 2, the port 3p is aligned with the guide plates 26 and 26a for the film F.

The arm 12 (or 12a) is provided with a magnet for attracting and holding the shell 3 of the patrone P. When the patrone has been passed to the arm 12 (as sensed by conventional detecting means), the solenoid 13 is actuated to rotate the arm in the direction of arrow (c), to thereby deliver the patrone to a winding station as indicated by the solid lines in FIG. 2.

(II) Disassembling the Patrone

Figure 4:
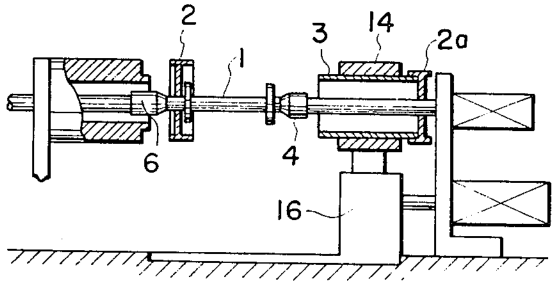
FIG. 4 shows a side view for describing a method of disassembling a patrone.
Figure 6:
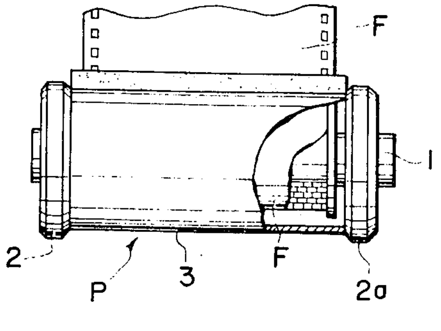
FIG. 6 shows a diagram, partly in section, of a partone loaded with a film.

Upon arrival of the patrone at the winding station, the air cylinder 5 is operated to move the chuck 4 to the left in the direction of arrow (a) in FIG. 1, whereby the chuck 4 pushes against one end of the spool 1 until the other end of the spool abuts against the chuck 6. Thus, the patrone P is firmly held by the chucks 4 and 6. The solenoid 13 is then released, and the arm 12 is returned to the position indicated by the two-dot chain line. Thereafter, the air cylinder 17 is operated to move the stand 16, including the chucks 14 and 14a, to the left along the groove 18 in the direction of arrow (g), stopping at the winding station. The stop position control of the stand 16 can be achieved by adjusting the stroke of the operating rod of the air cylinder 17 to a predetermined value. Upon the arrival of the stand 16 at the winding station, both of the air cylinders 15 and 15a are operated simultaneously, so that the chucks 14 and 14a move toward the center of the shell of the patrone to push the walls thereof inwardly. As a result, the end cap 2 is disengaged from the shell 3. Under this condition, the air cylinder 17 is again operated to move the stand 16 back to the right. During such movement, since the two ends of the spool 1 are held by the chucks 4 and 6, the cap 2 is removed from the shell 3 and the spool 1 and cap 2 are left at the winding station, as shown in FIG. 4.

(III) Supply of the Film

The film F to be wound in the patrone P, which has been previously cut to a predetermined length and configuration, is inserted between the guide plates 26 and 26a until the end portion of the film is engaged and held by the rollers 27 and 27a. The predetermined length and configuration of the film are as specified by, for example, Japanese Industrial Standard (JIS) K7519-1964. Where a hole for engaging the end of the film F is provided in the spool 1 together with a projection member, a mating hole for engaging the projection member is provided in the end of the film.

(IV) Engaging the Film End with the Spool

Figure 5:
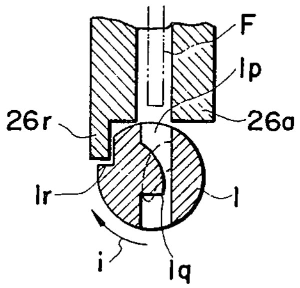
FIG. 5 shows a sectional diagram for describing the engagement of a film with a spool shaft.

After the above steps have been completed, the end portion of the film F is engaged with the spool 1 for the purpose of subsequently winding the film onto the spool. The method of engagement depends on the configuration of the spool, but will be described with reference to the spool having an engaging hole 1p and a projection 1q, as shown in FIG. 5, wherein reference character 1r designates a position detecting notch on part of the spool shaft, and 26r is a projection on the end of the guide plate 26 for engaging the notch 1r.

Figure 2:
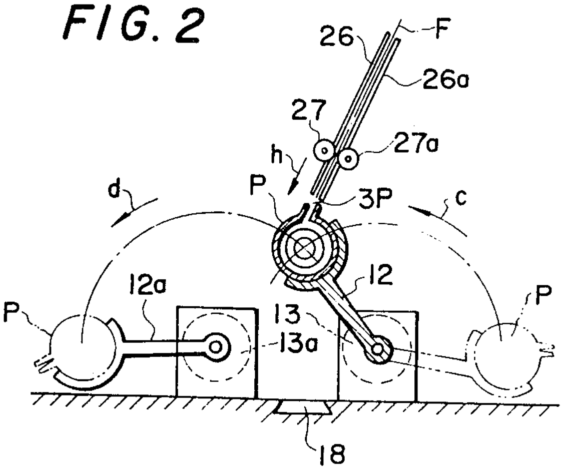
FIGS. 2 and 3 are sectional views taken along lines A—A and B—B in FIG. 1, respectively.
Figure 3:
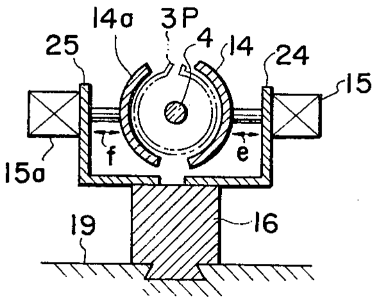

When the stand 16, as shown in FIG. 4, is returned to the right and the patrone P is disassembled, the guide plates 26 and 26a are fed by a driving mechanism (not shown) in the direction of arrow (h) in FIG. 2, whereby the end portions of the guide plates 26 and 26a are brought to a position adjacent the surface of the spool shaft. Thereafter, the motor 7 is operated to rotate the chuck 6 at a low speed to turn the spool 1 in the direction of the arrow (i) in FIG. 5 until the projection 26r of the guide plate 26 engages the notch 1r of the spool 1. The spool is then stopped with the engaging hole 1p in alignment with the film guiding direction of the guide plates 26 and 26a. As this spool positioning operation is carried out after the spool 1 has been withdrawn from the shell 3, a variety of methods for accurately detecting the position of the engaging hole 1p are available.

With the spool 1 stopped at the predetermined position the drive rollers 27 and 27a on the guide plates 26 and 26a are slowly driven to advance the end portion of the film F toward the spool 1, until it enters the hole 1p and engages the projection 1q.

(V) Winding the film on the Spool

When the end of the film F is engaged with the spool 1, the guide plates 26 and 26a are returned to their original positions and the operation of the drive rollers 27 and 27a is terminated. Thereafter, the motor 7 is operated to rotate the spool 1 at a high speed through the chuck 6, to thereby wind the film F thereon. When the film is wound to a predetermined length (the entire length minus the length of the end portion which remains exposed through the port 3p of the patrone P), the operation of the motor 7 is suspended. In this operation, the end portion of the film which has not been wound on the spool 1 is sandwiched between the drive rollers 27 and 27a.

Thus, the process of winding the film on the spool is completed, and since the film is wound on the withdrawn spool the surface of the film cannot be damaged by the inner wall of the shell 3 and the port 3p.

(VI) Reassembling the Patrone

Upon completion of the winding operation, the stand 16 is moved to the left again in the direction of arrow (g) to return the shell 3 to the winding station. As a result, the film F wound on the spool 1 is automatically inserted into the shell 3 and the unwound end portion of the film is extented or exposed through the port 3p of the shell. The gap of the port 3p can be increased by decreasing the compression force of the chucks 14 and 14a.

Upon the insertion of the film into the shell, the compression force of the chucks 14 and 14a is increased to positively secure the shell. Thereafter, the air cylinder 10 is operated to push the capper 9 in the direction of arrow (b) via the frame 11. As a result, the cap 2 previously removed from the shell 3 is pushed back again and snapped over the end of the shell by the capper 9, which is then moved back to its original position.

After the patrone P has been thus reassembled, the cap 2 and the shell 3 may be staked together so that the cap is more positively secured to the shell. The other cap 2a which is not removed from the shell 3 may be stacked thereto before the patrone P is brought to the winding station.

Since all of the steps from the diasemmbly of the patrone P to its reassembly are carried out on the same axis of the spool 1, the positional alignment of the disassembly parts can be readily carried out in a dark room, and the movement or operation of the device can be greatly simplified. During the reassembly of the patrone all of the disassembled parts are returned to their original positions, whereby the reassembly operation can be positively and accurately carried out.

(VII) Removal of the Completed Articles from the Device

When the capper 9 is returned to its original position and the winding of the film F is completed, the chucks 14 and 14*a* are moved apart in opposite directions, as indicated by arrows (*e*) and (*f*), and the stand 16 is thereafter returned to its original position. The solenoid 13*a* is then operated to rotate the arm 12*a* into magnetic engagement with the patrone, whereafter the air cylinder 5 is operated to withdraw the chuck 4 and release the patrone. The solenoid 13*a* is then energized to rotate the arm 12*a* in the direction of arrow (*d*) to remove the patrone P from the winding station. The completed articles thus removed are then transferred to the following work station, such as a packager, by a conveyor or the like.

In the disassembly of the patrone P, the spool 1 may be removed in either direction, depending upon the space available and the relationship with adjacent work stations.

The chucks 14 and 14*a* may also be so designed that one of the chucks is fixed, while the other is movable. In this case, it is preferable that the end of the shell 3 closest to the cap 2 is more strongly squeezed than the end nearest the cap 2*a* to facilitate the removal of the cap 2 and the shell 3.

Instead of moving the shell with the spool 1 being fixed, the spool may be moved in either axial direction with the shell 3 being fixed.

We claim:

1. A method of roll loading a precut strip of photographic film into a preassembled film cartridge including a slotted spool having means therein for engaging an end of the film strip, a slotted, cylindrical shell disposed concentrically around the spool, and a pair of opposite end caps disposed over the spool ends and engaging the ends of the shell, characterized by the steps of:

a. delivering a cartridge to a predetermined position at a work station,
b. axially gripping the ends of the spool to hold same at said position,
c. squeeze engaging the shell to release the end caps therefrom,
d. axially moving the shell relative to the spool to separate a released end cap from the shell and expose the spool,
e. aligning the spool slot with the film strip,
f. inserting an end of the film strip into the aligned slot and into engagement with the engaging means,
g. rotating the spool to wind the film thereof until just a leader portion end thereof remains exposed,
h. axially moving the shell and unseparated end cap relative to the spool to effect the reassembly thereof in such a manner that the leader portion end extends through and protrudes from the shell slot,
i. releasing the shell and reengaging the end caps therewith, and
j. removing the loaded cartridge from the work station.

2. A method as defined in claim 1, wherein the spool, shell, and end caps are maintained in axial alighment during all of the recited steps.

3. A method as defined in claim 1, wherein the end caps are reengaged by pressing them axially toward each other, whereby they snap fit over the ends of the shell.

4. An apparatus for roll loading a precut strip of photographic film into a preassembled film cartridge including a slotted spool having means therein for engaging an end of the film strip, a slotted, cylindrical shell disposed concentrically around the spool, and a pair of opposite end caps disposed over the spool ends and engaging the ends of the shell, characterized by:

a. means for delivering a cartridge to a predetermined position at a work station,
b. means for axially gripping the ends of the spool to hold same at said position,
c. means for squeeze engaging the shell to release the end caps therefrom,
d. means for axially moving the shell relative to the spool to separate a released end cap from the shell and expose the spool,
e. means for aligning the spool slot with the film strip,
f. means for inserting an end of the film strip into the aligned slot and into engagement with the engaging means,
g. means for rotating the spool to wind the film thereon until just a leader portion end thereof remains exposed,
h. means for axially moving the shell and unseparated end cap relative to the spool to effect the reassembly thereof in such a manner that the leader portion end extends through and protrudes from the shell slot,
i. means for releasing the shell and reengaging the end caps therewith, and
j. means for removing the loaded cartridge from the work station.

5. An apparatus as defined in claim 4, wherein the means for delivering and the means for removing each individually comprises a pivotally mounted arm member having magnetic means thereon for attractively engaging the cartridge.

6. An apparatus as defined in claim 4, wherein the means for axially gripping and the means for rotating comprises a pair of axially aligned and relatively movable chuck members, and a rotary drive source coupled to one of the chuck members for rotating both chuck members together with a spool gripped therebetween.

7. An apparatus as defined in claim 4, wherein the means for squeeze engaging and the means for axially moving comprises a stand, means for bidirectionally moving the stand relative to the spool axis, a pair of chuck members mounted on the stand opposite each other and configured to engage the shell, and means for moving at least one of the chuck members both toward and away from the other chuck member.

8. An apparatus as defined in claim 4, wherein the means for aligning comprises a film feed chute having a projection thereon, means for moving the chute both toward and away from the gripped spool, a recess on the spool, and means for rotating the spool until the recess engages the projection.

9. An apparatus as defined in claim 4, wherein the means for reengaging the end caps comprises means for pressing them axially toward each other, whereby they snap fit over the ends of the shell.

* * * * *